June 24, 1947.  H. E. RUE  2,422,750
PLASTIC BOTTLE CROWNER
Filed June 5, 1943  5 Sheets-Sheet 1

INVENTOR
HAROLD E. RUE
BY
ATTORNEYS

June 24, 1947.  H. E. RUE  2,422,750
PLASTIC BOTTLE CROWNER
Filed June 5, 1943  5 Sheets-Sheet 2
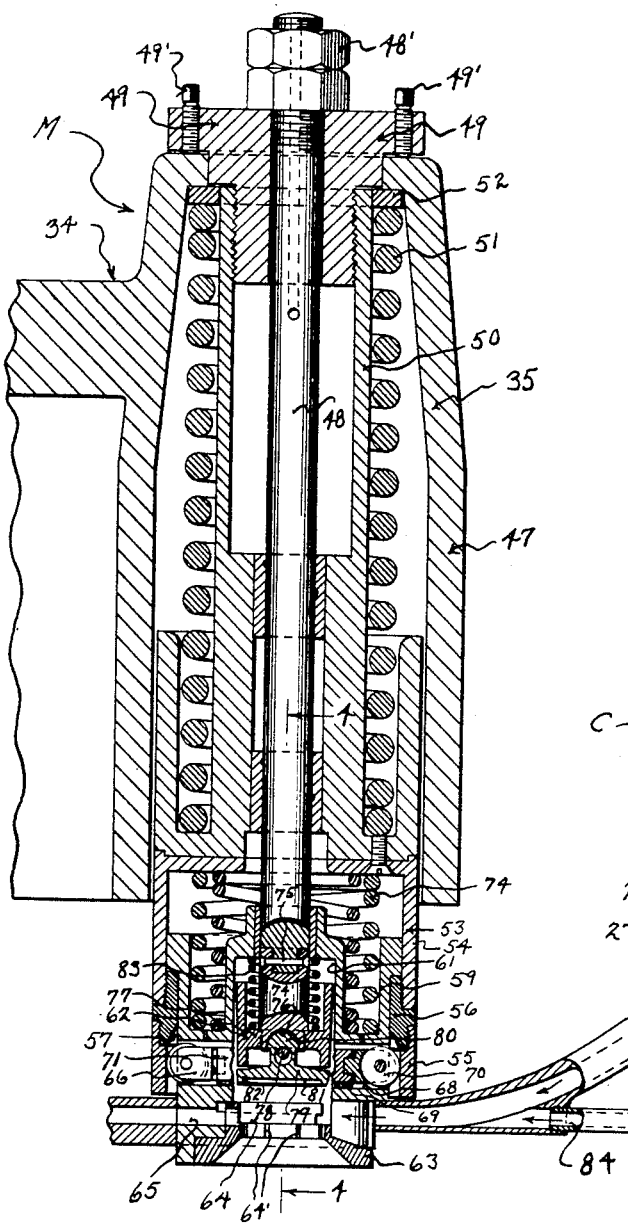
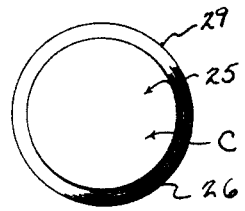
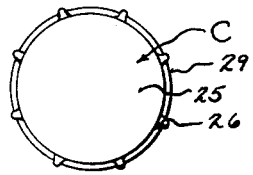
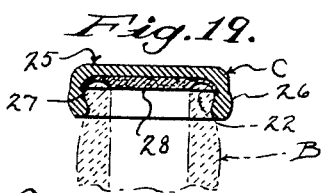
INVENTOR
HAROLD E. RUE
BY
ATTORNEYS June 24, 1947.  H. E. RUE  2,422,750
PLASTIC BOTTLE CROWNER
Filed June 5, 1943  5 Sheets-Sheet 3
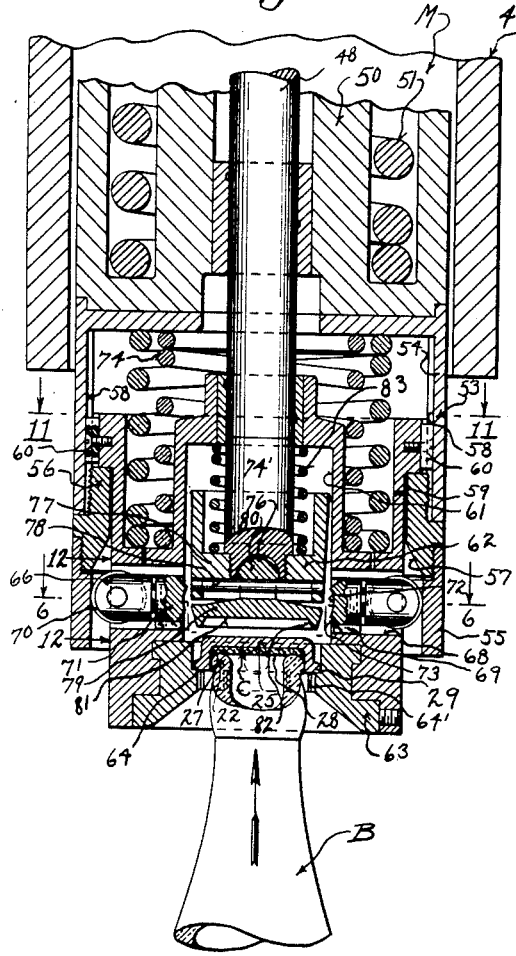
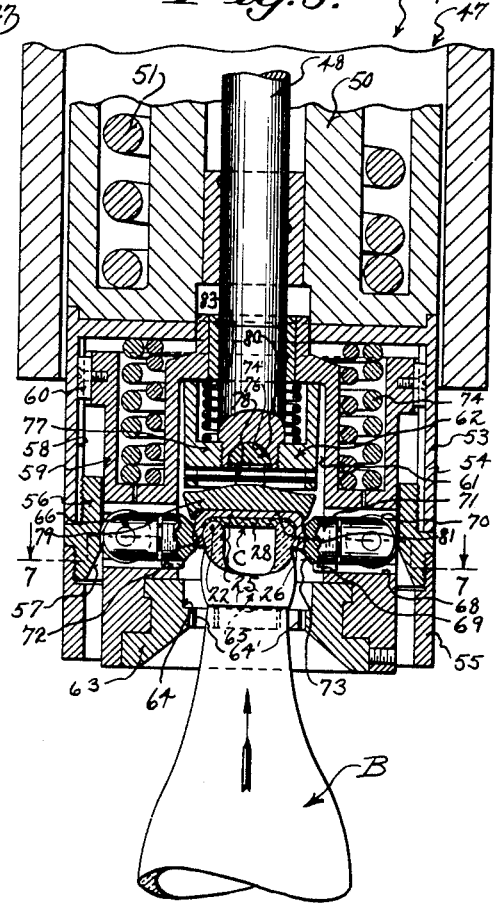
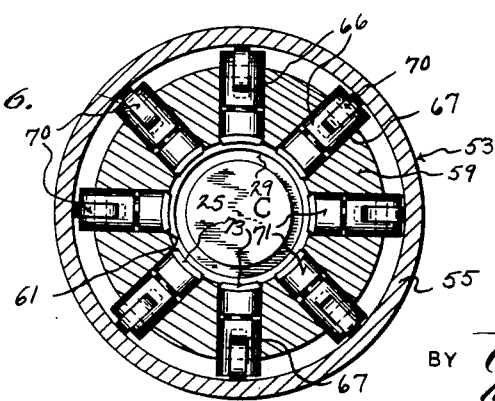
INVENTOR
HAROLD E. RUE
BY
ATTORNEYS June 24, 1947. H. E. RUE 2,422,750
PLASTIC BOTTLE CROWNER
Filed June 5, 1943 5 Sheets-Sheet 4
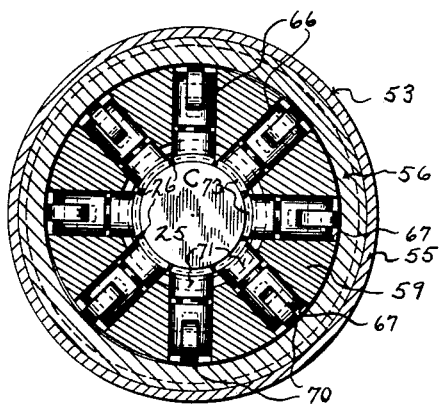
Fig. 7.
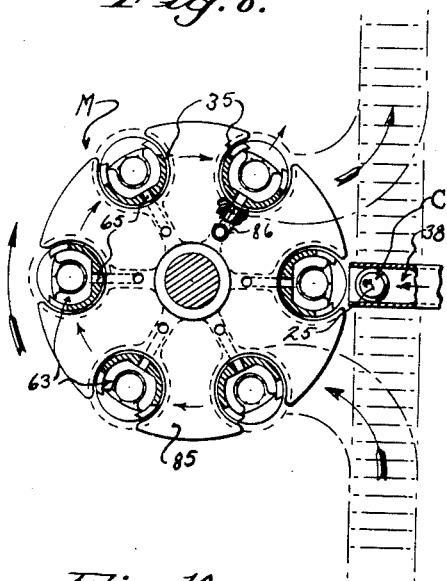
Fig. 8.
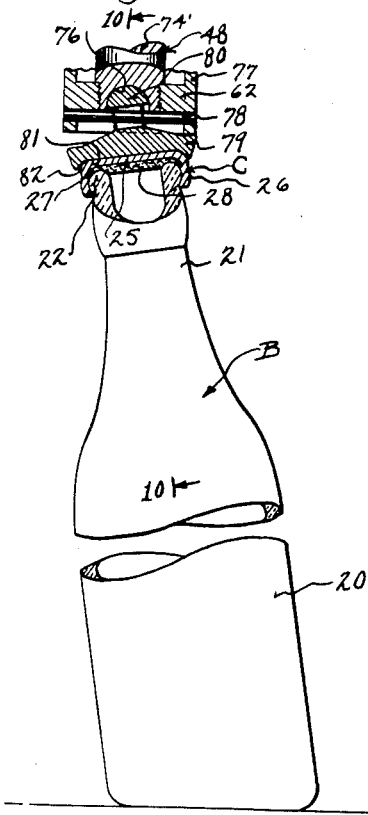
Fig. 9.
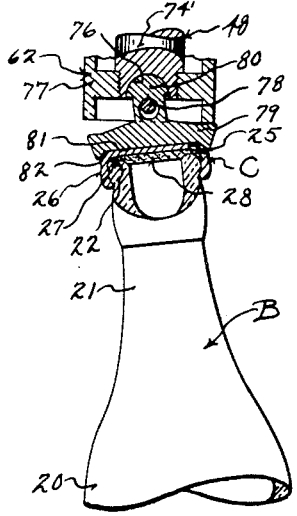
Fig. 10.
INVENTOR
HAROLD E. RUE
BY 
ATTORNEYS June 24, 1947.  H. E. RUE  2,422,750
PLASTIC BOTTLE CROWNER
Filed June 5, 1943
*Fig.11.*
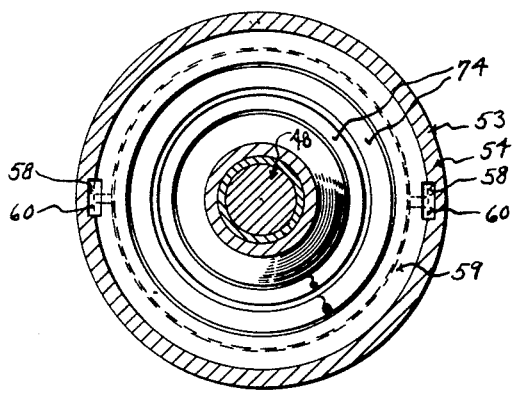
*Fig.12.*
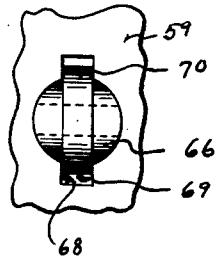
*Fig.13.*
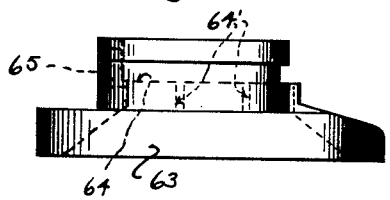
*Fig.14.*
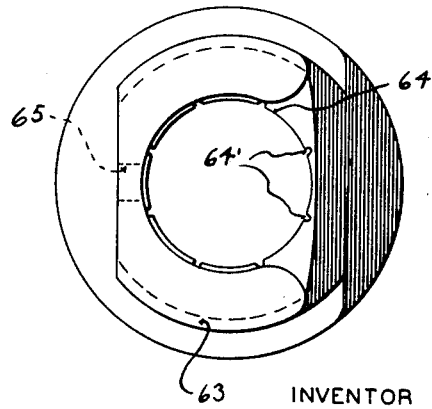
*Fig.15.*
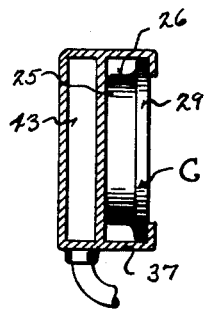
INVENTOR
HAROLD E. RUE
BY
ATTORNEYS Patented June 24, 1947

2,422,750

UNITED STATES PATENT OFFICE 2,422,750

PLASTIC BOTTLE CROWNER

Harold E. Rue, Wauwautosa, Wis., assignor to Pabst Brewing Company, Milwaukee, Wis.

Application June 5, 1943, Serial No. 489,771

8 Claims. (Cl. 226—80)

This invention appertains to bottle capping and more particularly to a novel machine for forming or molding plastic crown caps on bottle necks to bring about the tight sealing of the bottles.

One of the primary objects of my invention is to provide a crown capping machine, which will efficiently handle plastic caps and which will effectively apply the caps to the bottles and perfectly seal the bottles.

Another salient object of my invention is to provide a means to permit the employance of plastic caps for sealing bottles, which is of such a character that a minimum amount of change will be necessary in standard bottle crowners now being used, so that the necessity of completely redesigning such machines is eliminated.

A further object of my invention is the provision of novel means for heating the skirts only of the caps, as the crowns are fed to the crowning heads, whereby the skirts can be readily deformed and pressed into sealing contact with the bottles.

A further important object of my invention is the provision of means operating in conjunction with the chute which delivers the caps from the hopper to the crowning heads, for heating the skirts only of the caps to a moldable condition by a battery of infrared lamps, so that the caps can be effectively acted upon by the cap plungers in the crowning heads.

A further important object of my invention is the provision of novel means for constructing and associating the axial hold-down plungers with the crowning heads, whereby the caps will be effectively centered relative to the bottle necks irrespective of the fact whether the bottle or bottle necks are at an incline to the vertical so as to insure the tight sealing of the bottles.

A further important object of my invention is the provision of novel side plunger members for engaging around the periphery of the skirt of the caps for pressing and molding the skirts of the caps around the bottle lips to seal said bottles.

A further important object of my invention is the provision of novel means for constructing the crowning heads whereby the side or radial skirt pressing and deforming plungers will be automatically and synchronously operated to bring about the desired sealing of the bottles.

A further important object of my invention is the provision of novel means for constructing the crowning heads whereby the axial hold-down and centering plunger will initially bring about the correct positioning of the cap on the bottle top with the cork or other sealing disc in compressed condition against the surface of the lip of the bottle top and thereafter the side or radial plungers will be operated for pressing the skirt of the caps under the lip or flange of the bottle.

A still further object of my invention is the provision of means located past the crowning station for continuously cleaning the cap platform of the crowning heads by a blast of air, so that if a cap is inadvertently left in a crown head (such as through the failure of feeding bottles to the crowner) such cap will be blown out of said platform, before the platform reaches its station for receiving a new heated cap from the delivery chute.

A still further important object of my invention is the provision of novel means for constructing the plastic cap itself, whereby to insure the perfect and full sealing of the cap entirely around the lip of a bottle and to form the skirt of the cap in such a way that the proper deforming of the skirt is assured under the bottle lip.

A still further important object of my invention is to provide a tamper-proof package by the employance of a new and novel plastic closure cap, which will of necessity, have to be mutilated or distorted to remove the same from the bottles so that the cap cannot again be forced on the bottle, whereby any tampering with said bottles or attempts to reseal the bottles by unauthorized persons will immediately appear.

With these and other objects in view, the invention consists in the novel construction, arrangement and formation of parts, as will be hereinafter more specifically described, claimed and illustrated in the accompanying drawing, in which drawings:

Figure 3 is an enlarged, detail, vertical, sectional view through one of the crowning heads of the crowning machine.

Figure 4 is a detail, vertical, sectional view through the lower portion of a crowning head, the section being taken on the line 4—4 of Figure 3, the view being on a larger scale than that shown in Figure 3.

Figure 5 is a view similar to Figure 4 but showing the bottle in its raised position for bringing about the sealing and capping of the bottle.

Figure 6 is a detail, horizontal, sectional view taken on the line 6—6 of Figure 4 looking in the direction of the arrows showing the radial skirt deforming plungers prior to the operation thereof for deforming the skirt of the cap.

Figure 7 is a horizontal, sectional view similar to Figure 6, the view being taken, however, on the line 7—7 of Figure 5 and showing the radial side plungers after operation for deforming and molding the skirt on a bottle cap around the lip or flange of a bottle.

Figure 8 is a horizontal, sectional view through the complete rotary crowner head, the view being of a diagrammatic nature and illustrating the path of the bottles into the crowning head.

Figure 9 is an enlarged, detail, vertical, sectional view through the axial top hold-down and centering plunger illustrating the action of the swivel head when an inclined bottle or bottle neck is encountered, the inclination of the bottle being exaggerated in this figure.

Figure 10 is a view similar to Figure 9 but taken at right angles thereto and on the line 10—10 of Figure 9 looking in the direction of the arrows.

Figure 11 is an enlarged, detail, horizontal, sectional view taken through one of the crowner heads on the line 11—11 of Figure 4 looking in the direction of the arrows.

Figure 12 is a detail, vertical, sectional view taken on the line 12—12 of Figure 4 looking in the direction of the arrows illustrating the outer end of one of the side radial sealing plungers.

Figure 13 is an enlarged, detail, side, elevational view of one of the crown cap platforms for the crowning heads.

Figure 14 is a top, plan view of the platform.

Figure 15 is an enlarged, detail, horizontal, sectional view through the delivery chute for the caps, the section being taken on the line 15—15 of Figure 1 looking in the direction of the arrows.

Figure 16 is a top, plan view of one of the caps prior to the molding or deforming thereof around a bottle lip.

Figure 17 is a similar view and showing the cap after being pressed or molded around the bottle lip.

Figure 18 is a side, elevational view of one of the bottle caps after the pressing or forming thereof around a bottle lip.

Figure 19 is an enlarged, fragmentary, detail, sectional view through one of my caps.

Referring to the drawings in detail, wherein similar reference characters designate corresponding parts throughout the several views, the letter M generally indicates a crowning machine constructed in accordance with my invention for applying my plastic caps C to bottles B.

Figures 1, 2:
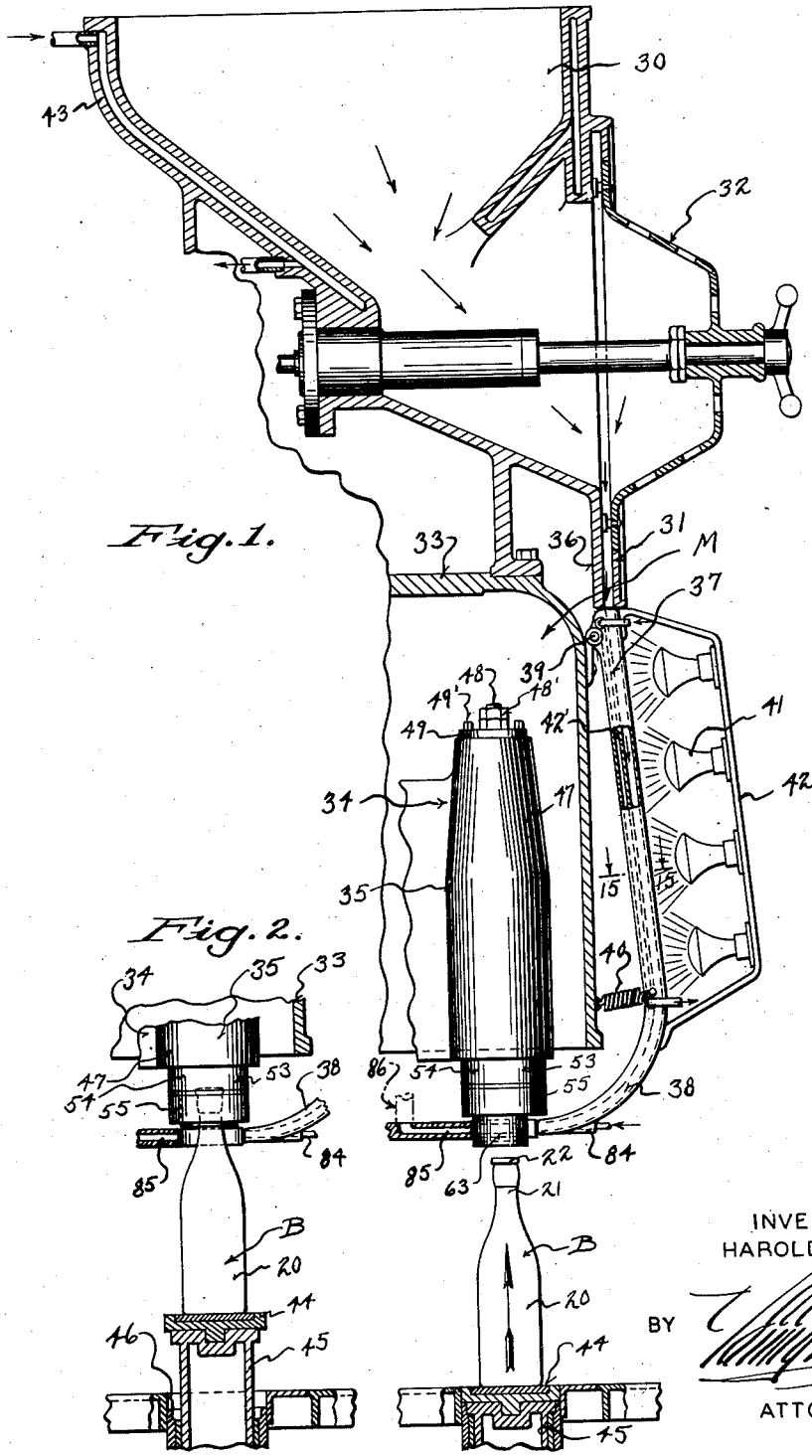
Figure 1 is a fragmentary, detail, vertical, sectional view through a bottle crown capping machine showing a bottle moving to its crowning station.
Figure 2 is a detail, fragmentary, sectional view showing a part of the bottom of Figure 1, but with the bottle in its raised position to bring about the capping of the bottle.

This machine M is of the general character now found in the open market for applying metal crown caps to bottles (such as the Jumbo crowner of the Crown Cork and Seal Company of Baltimore, Maryland) and hence only sufficient parts of this machine have been illustrated to show the novel features of my invention. In applying my plastic caps C to bottles B, certain new and novel features have been incorporated in the conventional crowner, such as means for heating the skirts only of the bottle cap C and the novel crowning heads for applying the caps to the bottles B. While I have mentioned one particular type of crowning machine, it is to be understood that the novel features of my invention can be incorporated with other various types of crowners.

The plastic cap C can be applied to ordinary bottles B and hence no change in the bottles themselves is necessary at all. Thus the bottles B each include the body 20 and the neck 21. The extreme upper end of the neck 21 is provided with the usual lip or flange 22 over which the caps are placed. However, attention is directed to the plastic caps C, as these caps are of special form and shape.

Each cap C includes a substantially flat top wall 25 and a depending annular skirt 26. At the point of juncture of the skirt with the top wall, the cap is provided with a curved inner face 27, the purpose of which will be later set forth. A compressible disc 28, such as ground cork, is placed in the cap against the inner surface of the top wall and the disc extends into engagement with the inner surface of the skirt and over the curved face 27. The outer surface of the skirt at its extreme lower end is provided with an annular outstanding flange 29. This flange 29 adds strength to the skirt and provides sufficient material to insure the molding of the skirt under and around the flange or lip 22.

The machine M includes a hopper 30 for the caps C and the caps are fed, one at a time, with the skirts outermost to the cap chute 31 by means of a feed dial assembly 32 now found in the usual machine. The hopper 30 is mounted on the machine frame 33 above the rotary head casing 34. This rotary head casing 34 includes a plurality of radially disposed crowning heads 35 which form an important part of my invention, as will be later described. The bottles are fed to the crowning heads in proper timed relation by means of a star wheel (not shown) and the bottles are removed from the crowning heads after the crowning operation by a similar star wheel, (also not shown). In Figure 8 the path of the bottles to and from the crowning heads is shown diagrammatically and it can be seen from this figure that the caps C are fed, one at a time, into each crowning head during the rotation of the crowning head casing and the feeding station of the caps is located between the inlet of the bottles to the crowning heads and the outlet of the bottles from the crowning heads.

Referring back to the feed chute 31 for the caps, it is to be noted that the same consists of a depending portion 36 which leads from the hopper and a straight portion 37 which communicates with the portion 36 for receiving caps therefrom. This portion 37 leads to the crowning heads, see Figure 8, and is provided with an inturned curved lower end 38 for this purpose. If desired, the said portion 37 of the chute can be hingedly mounted, as at 39, on the machine casing and the lower end thereof can be urged toward the crowning head by a contractile coil spring 40.

One of the important features of my invention is the provision of means for heating the skirts of the plastic cap C to a moldable condition and the means for heating the skirts of the caps is located between the hopper and the crowning head casing. This location is of importance as the skirts are served to each separate crowning head in their heated condition. For the purpose of illustration, I have shown a battery of infrared lamps 41 carried by a casing 42 which is secured directly to the receiving cap feed chute 37. The exact arrangement of the battery of infrared lamps may be changed and, in fact, another form of heating the skirts by the infrared lamps forms the basis of another invention and the application for another patent.

As stated, the use of infrared lamps for heating the skirts of the cap C is by way of illustration only, and other means can be utilized along the length of the chute 37 for heating the caps and the skirts of the caps can be rendered in a moldable condition by high frequency electrostatic heating or high frequency induced heating.

It is important to note, however, that the caps are fed down the chute 37 with the skirts facing the battery of infrared lamps and hence these skirts only are heated and the top walls of the caps are protected from the heat of the infrared lamps by the cork discs 28. If desired and preferred, the rear or inner wall of the chute can carry a water jacket 42' so as to maintain the top walls of the cap in a comparatively cool condition. Inlets and outlets for the water are carried by the terminals of the chute.

However, the caps can be subjected to a preheating treatment, if preferred, to take the initial chill off of the same and hence the hopper 30 can be provided with a water jacket 43. Water or other heating fluid can be circulated through the jacket in any preferred manner and the jacket is provided with inlets and outlets for the fluid.

As heretofore stated, the bottles are fed to the individual crowning heads 35 in proper timed relation to the rotation of the head casing 34 and when the bottles reach the crowning station, the same are forcibly raised on the bottle platform 44 by the piston 45 which reciprocates within the cylinder 46. The piston is reciprocated in proper timed relation by any suitable means, such as a cam mechanism (not shown), as is well known in this art. The machine M can embody any number of the crowning heads 35.

Particular attention is now directed to Figures 3, 4, and 5, in which the operation of my novel crowning heads 35 is shown. The crowning head 35 includes a substantially cylindrical housing 47, which forms a part of the head casing and these housings are located radially around the head casing in the usual manner. Axially mounted within each crown head housing 47 is the crown hold-down plunger 48 and this plunger is slidably mounted in the crown plunger spring nut 49 and the compensating spring holder 50. This holder 50 has threaded connection with the nut 49 and is normally held in its lowered position by the compensating spring 51, which engages the lower end thereof. The upper end of the spring 51 bears against the compensating spring washer 52 which in turn bears against the upper end of the housing 47. The compensating spring 51 is of the coil type and is of a relatively strong nature.

Fixed to the lower end of the spring holder 50 is a substantially cylindrical guide shell 53 and this shell includes the upper and lower sections 54 and 55, which are connected by the crown forming plunger throat ring 56. The inner face of the throat ring 56 at its lower end is tapered upwardly and inwardly, as at 57, for a purpose, which will be later set forth. The upper section 54 of the shell is provided with vertical guide ways 58.

Slidably mounted in the guide shell 53 is the crown forming plunger cage or carrier 59 and it is to be noted that the axial crown hold-down plunger 48 extends into the cage or carrier 59 and that the cage or carrier slides on the axial plunger as well as within the shell 53. The carrier or cage 59 is accurately guided in its sliding movement due to its engagement with the shell and the cage or carrier carries wear guide shoes or blocks 60, which are slidably received in the guide face 58. The cage or carrier 59 is axially chambered, as at 61, to receive the novel head assembly 62 of the axial hold-down plunger 48. This novel head assembly will be later described in detail.

The lower end of the cage or carrier 59 has removably associated therewith the crown platform 63 and the outer side of the platform and the carrier are open to permit the riding of a crown from the lower curved end 38 of the crown chute into the platform and on the crown shoulder seat 64. This seat is provided with spaced vertical grooves 64'. The opposite side of the crown platform 63 and the carrier 59 are provided with registering openings 65, for a purpose, which will also later appear.

Slidably mounted within the cage or carrier 59 directly above the crown seat is a plurality of radially extending crown forming or crimping plungers 66. The carrier is provided with radially extending bores 67 for receiving these plungers and the walls of the bores can be provided with guide grooves or key ways 68 for receiving guide blocks or keys 69 on said plungers, whereby to accurately guide said plungers in their movement and to prevent turning of the plungers in their bores. The outer ends of the plungers 66 carry anti-friction rollers 70 which normally engage the inner surface of the lower section 55 of the guide shell 53. These rollers 70 also ride in the grooves or key ways 68. During the upward movement of the cage or carrier 59 the rollers contact the inclined surface 57 of the throat ring 56 whereby said plungers will be synchronously moved inward as will be also more clearly set forth. The plungers 66 preferably include removable hardened forming heads 71 and particular stress is laid on the shape of these forming heads. The bodies of the plungers are provided with threaded shanks and the heads 71 are adjustably carried by said shanks, whereby the heads can be adjusted back and forth radially, within certain limits relative to the thrust anti-friction rollers 70. The guide blocks 69 are carried directly by the heads 71 and the rollers are carried directly by the bodies of the plungers so that after adjustment of the head and the positioning of the plungers in their bores 67, further accidental turning movement of the heads and bodies relative to one another will be prevented. The inner end of each plunger head 71 has an intermediate curved forming surface 72 and inclined guide faces 73 above and below the curved forming face.

The grooves 64' in the crown shoulder seat 64 are located below and between the plunger heads 71. This allows the easy passage of the formed crown caps on the bottles through the crown platform 63. Otherwise, there is danger of the ribs left on the crown caps by the forming plungers catching on the crown shoulder 64.

A pair of nested coil springs 74 are fitted within the shell 53 and engage the upper end of the shell and bear down against the carrier or cage 59 for normally holding the cage in a lowered position with the rollers 70 of the plungers 71 below the throat ring. These springs 74 also provide proper sealing pressure on the sealing discs in the crown caps. Thus during the action of the forming plungers to mold the cap skirts, the springs 74 maintain maximum sealing pressure on the caps and their discs.

Now referring to the novel head assembly 62 of the axial hold-down plunger 48, it can be seen that the same includes a shank portion 74' which is removably secured to and in axial alignment with the main body portion of the plunger 48, by threading the same in place. A suitable pin 75 can be utilized for preventing the shank from turning relative to said plunger body. The lower end of the shank is provided with a ball socket 76 and the shank around the socket is reduced in diameter and externally threaded for receiving the thimble 77. The lower end of the thimble is chambered and carries a diametrically extending pivot pin 78. Rockably mounted on the pivot pin 78 is the hold-down head 79 of the hold-down head assembly. Formed axially on the head 79 is the upstanding axially disposed semispherical bearing stud 80. This bearing stud is loosely fitted within the socket 76 and is diametrically bored to receive the pivot pin 78. The bore is of a greater size than the pin so as to permit the head 79 to swing back and forth and at right angles to the pin. The head is suspended on the pin for free swinging movement in different directions and normally the semi-spherical bearing stud is slightly spaced from the inner bearing surface of the socket 76.

As intimated, the hold-down head assembly is utilized for engaging and centering the crown cap on the top of the bottle, as will be later more fully described, and the lower face of the head 79 of the assembly is recessed, as at 81, for receiving the upper end of the cap and the outer wall 82 of this recess is inclined upwardly and inwardly so as to provide a lead and guide surface for the crown cap for centering the cap in said head. A relatively light expansion coil spring 83 is placed about the hold-down plunger and is confined between the head assembly 62 and the cage or carrier 59 and consequently there is a constant spring pressure on said head assembly. This spring 83 functions to aid in the expelling of the bottle and cap from the assembly after the crowning operation.

In operation of my novel apparatus, the crowns or caps are selected from the hopper 30 and fed into the chute 31 with their skirts facing outermost and the chute from its top to its bottom becomes loaded with the crowns or caps. The caps are now subjected to the heat emanating from the battery of infrared lamps and the skirts are heated to a moldable condition. The top walls 25 of the caps are protected from the intense heat of the infrared lamps by their cork discs 28 and these walls can also be cooled by the water chamber 42'. As a crown head 35 passes the lower curved end of the chute, a cap is forced into the crown platform on the shoulder seat 64 by gravity and the weight of the other caps in the chute pressing thereon. If desired, the lower end of the chute 38 can have communicating therewith a nipple 84 for directing a blast of heated air into the chute for urging the cap into the crown platform. Air under pressure can be supplied to the nipple from any preferred source. At this time, it is also well to note that the head casing 34 carries a spider wheel 85 which is in alignment with the lower end of the crown chute so that, as a crown head 35 moves past the lower end of the chute, the chute will bear against said spider wheel and thereby prevent the further feeding of the crowns until another head 35 reaches the chute.

As heretofore stated, the bottles are fed into and out of the head casing in proper timed relation and when a bottle is delivered to its head 35 and the bottle and head reach the crowning station, the piston 45 is elevated and the bottle resting on the piston is moved forcibly upward, lifting the crown cap on the platform off of its shoulder seat and into engagement with the hold-down plunger head 79 and the curved face 82 of the plunger head properly guides the cap on the bottle.

Proper seating of the crown cap on the top of the bottle is assured, by not only the centering thereof by the inclined guide face 82 on the hold-down head 79, but also by the fact that the hold-down head is swivelly carried by the hold-down plunger 48. The head 79 can swing in all directions and consequently, if a bottle or bottle neck is canted to the vertical (see Figures 9 and 10) the head 79 will tilt and properly hold the crown cap directly on the bottle. This permits the desired and effective seal and this feature forms an important part of my invention.

As the bottle is forcibly urged upward by the piston 45, the hold-down plunger is initially raised against the tension of the coil spring 83 until the part 77 of the head engages the upper end of the carrier or cage 59, at which time the carrier or cage is forcibly lifted against compression of the relatively heavy nested coiled springs 74. As the carrier or cake 59 is raised (see Figure 5) the crown cap will be forcibly held on its seat and the cork sealing disc 28 will be compressed around the curved lip of the bottle. The compressing of the cork disc 28 around the curved lip of the bottle is assured, due to the curved face 27 formed on the cap at the juncture of the top wall 25 of the cap with the skirt 26. When the cage or carrier moves upwardly with the bottle, the cap skirt deforming and molding plungers 66 are forcibly urged radially inwardly toward the center axis of the bottle neck (see Figure 6) by the engagement of the antifriction rollers 70 with the cone shaped guide face 57 of the collar 56, which forms a part of the shell. Positioning of the parts is such, that the capping plungers 66 engage the heated skirt 26 substantially around the entire periphery thereof (see Figure 7), directly at the annular enlargement 29 of the skirt and the skirt is molded under and around the bottle lip and the annular enlargement 29 of the crown cap adds strength to the cap and assures sufficient material on the cap to be molded under the bead. As the rollers 70 move past the cone crowning seat 57, the rollers engage the cylindrical face of the collar 56 and are held inwardly around the cap. This gives added instant for holding the skirt under the head during the setting of the plastic forming the cap.

If it should happen, that a relatively tall bottle is encountered, breakage of this bottle will be prevented, due to the fact that the cage or carrier 59 will be brought up against the top of the shell 53 and the compensating spring 51 will be brought into play and the compensating spring will allow all parts to move upwardly against the compression of the heavy compensating spring 51.

Adjustment of the centering hold-down plunger 48 can be had by means of nuts 48' threaded on the upper edge of the plunger and these nuts bear against the top of the crown plunger nut 49. The crown plunger nut 49 also carries screws 49', which engage the top of the crowning head casing 47, which permits adjustment of the whole assembly.

As the piston 45 rides to its downward lowered position, the bottle is released and the parts are returned to their normal position by the springs 74 and 83. As the hold-down plunger head 79 is returned to its normal position by its spring 83, the hold-down plunger head will engage the upper inclined surfaces of the crowning plungers 66 and these plungers will be moved radially outwardly.

Great stress is laid on the curved faces 72 of the crowning plungers, as these curved faces come in direct alignment with the bead on the bottle during the deforming of the skirts of the crown caps and these curved faces 82 properly mold and form the skirt under and around the bead.

As the bottles leave their crowning stations, the same are fed around with the crowner head and the bottles are carried away in the usual manner from the feed-off station.

If it should happen, through accident or otherwise, that a bottle is not fed to its crowning head, the crown cap in said head will be removed automatically from off of its seat 64. This is to prevent jamming of the machine and so that a cold cap will not be inadvertently moved to a crowning station. Any preferred means can be employed for removing such a cap from its seat and, as illustrated, in Figure 8, an air blast nozzle 86 is arranged beyond the crowning station and air under pressure is fed through this nozzle. As each crowning head reaches a predetermined position, the air blast nozzle 86 will register with the air opening 65 formed in the crown platform 63 and the blast of air from the nozzle will carry the crown out of the platform. This blast of air also serves as an effective means for cleaning the crown seats. The crown chute 37 can be modified in various ways and various means can be employed for insuring the proper heating of the skirts of the bottle caps.

From the foregoing description, it can be seen that I have provided an automatic bottle capping machine in which the crowns are heated on their way to the crowning head and at the same time that they are being used.

Changes in details may be made without departing from the spirit or the scope of my invention, but what I claim as new is:

1. In a machine for crowning bottles with plastic preheated caps of the type having a top wall, a depending skirt and a sealing disc fitted against the inner surface of the top wall, a crowning head comprising a platform for initially receiving a cap and from which the cap is adapted to be picked up by a bottle, an axial hold-down and sealing plunger for centering the cap on the bottle with sealing pressure, an axially movable cage, a plurality of radially disposed sliding sealing plungers carried by the cage, means for forcibly urging the sealing plungers into engagement with the skirt of the cap for forming and molding the skirt of the cap about the bead on the bottle, said hold-down and sealing plunger including a plunger rod and a head, said head having an annular lower inclined cap centering surface, a universal joint connection between the head and rod, said universal joint connection including an axially disposed shank on the head terminating in a semi-spherical bearing member and said shank having an enlarged opening therethrough, said rod having a semi-spherical socket for receiving the bearing member, and a pivot pin carried by the rod extending through the opening, the opening being of a greater diameter than the pin, whereby the head normally hangs on the pin.

2. In a machine for crowning bottles with plastic caps, a crowning head comprising a case, a sealing plunger axially carried by the casing, a cap engaging head carried by the plunger, a normally stationary guide shell surrounding the plunger and head, a cone on the inner surface of said shell, a cage slidably mounted in the shell, spring means normally holding the shell in a lowered position, a plurality of radially disposed skirt molding plungers slidably carried by the cage, means on the outer ends of the plungers for engaging the cone, whereby upon upward movement of the cage the plungers will be uniformly and synchronously urged inward.

3. In a machine for crowning bottles with plastic caps, a crowning head comprising a casing, a sealing plunger axially carried by the casing, a cap engaging head carried by the plunger, a normally stationary guide shell surrounding the plunger and head, a cone on the inner surface of said shell, a cage slidably mounted in the shell, spring means normally holding the shell in a lowered position, a plurality of radially disposed skirt molding plungers slidably carried by the cage, means on the outer ends of the plungers for engaging the cone, whereby upon upward movement of the cafe the plungers will be uniformly and synchronously urged inward, and means for adjusting the active length of said sealing plungers.

4. In a machine for crowning bottles with preheated plastic caps, a crowning head including a casing, an axially disposed hold-down and sealing plunger slidably carried by the casing, a guide shell surrounding the axial plunger, an overload compensating spring normally holding the shell against movement, a sealing and centering head on the axial plunger, a cage slidably carried by the axial plunger and shell, spring means normally holding the cage in a lowered operative position, said axial plunger and cage having interengaging portions when the plunger is raised a predetermined distance by a bottle, a plurality of radial sealing plungers slidably carried by the cage, the shell having an upwardly and inwardly directed cone bearing face disposed above the axial plunger and sealing head when parts are in their normal operative position, and bearing members carried by the outer ends of the radial sealing plungers adapted to engage the cone surface when the axial plunger and cage are raised by a bottle during operation for sliding and urging the radial sealing plungers inward around the skirt of a cap.

5. In a machine for crowning bottles with preheated plastic caps, a crowning head for receiving caps and bottles one at a time including a casing, an axially disposed sealing and hold-down plunger slidably mounted in the casing having a depending centering and sealing head rockably mounted thereon, a normally stationary guide shell associated with the casing, a cage slidably carried by the shell and axial plunger, said plunger having means engaging the cage for lifting said cage after a predetermined movement of the plunger upon sliding movement of the plunger during the crowning operation, light tension means normally holding the plunger and head in a lowered position relative to the cage, relatively heavy spring means normally holding the cage in a lowered position in the shell, a plurality of radially slidable skirt molding and sealing plungers carried by the cage having bearing members on their outer ends, a cone on the shell disposed in the path of said bearing members during the raising of the cage for urging the axial plungers inwardly, and a platform carried by the lower end of the cage directly below said head for receiving the caps.

6. In a machine for crowning bottles with preheated plastic caps, a crowning head for receiving caps and bottles one at a time including a casing, an axially disposed sealing and hold-down plunger slidably mounted in the casing having a depending centering and sealing head rockably mounted thereon, a normally stationary guide shell associated with the casing, a cage slidably carried by the shell and axial plunger, said plunger having means engaging the cage for lifting said cage after a predetermined movement of the plunger upon sliding movement of the plunger during the crowning operation, light tension means normally holding the plunger and head in a lowered position relative to the cage, relatively heavy spring means normally holding the cage in a lowered position in the shell, a plurality of radially slidable skirt molding and sealing plungers carried by the cage having bearing members on their outer ends, a cone on the shell disposed in the path of said bearing members during the raising of the cage for urging the axial plungers inwardly, and a platform carried by the lower end of the cage directly below said head for receiving a cap, the cap being adapted to be lifted off of the platform by a bottle and said radial plungers each including an inner curved molding face adapted to engage the skirt of the lifted cap and said curved molding faces being in horizontal alignment with the bead on the neck of a bottle upon inward movement of said plungers.

7. In a machine for crowning bottles with preheated plastic caps, a rotary crowning member including a plurality of individual crowning heads for receiving the preheated caps, said crowning heads being movable to different stations, and automatic means for removing a cap from a crowning head after predetermined rotary movement of the crowning member if the cap has not been engaged by a bottle.

8. In a machine for crowning bottles with plastic caps, a rotary crowning member including a plurality of individual crowning heads for receiving caps movable to different stations, and an automatic means for removing a cap from a crowning head after predetermined rotary movement of the crowning member if said cap has not been engaged by a bottle, said means including an air port in each of said crowning heads diametrically opposite the crown receiving inlet formed in each head, and a compressed air delivery conduit adapted to register with the ports in said crowning heads during rotary movement of the crowning member.

HAROLD E. RUE.

REFERENCES CITED

The following references are of record in the file of this patent:

UNITED STATES PATENTS

| Number | Name | Date |
|---|---|---|
| 2,198,225 | Newy | April 23, 1940 |
| 2,040,851 | Johnson | May 19, 1936 |
| 2,241,445 | Gantzer | May 13, 1941 |
| 2,157,013 | Pommer | May 2, 1939 |
| 2,006,450 | Gaynor | July 2, 1935 |
| 2,193,440 | Walchon | Mar. 12, 1940 |
| 1,863,081 | Bellows | June 14, 1932 |
| 2,014,093 | Terrill | Sept. 10, 1935 |
| 2,019,402 | Duffy | Oct. 29, 1935 |
| 2,325,309 | De Swart | July 27, 1943 |
| 2,325,086 | Vore | July 27, 1943 |
| 2,325,050 | Goodwin | July 27, 1934 |
| 2,325,160 | Goodwin | July 27, 1934 |
| 541,898 | Thatcher | July 2, 1895 |
| 2,087,251 | Gough | July 20, 1937 |
| 2,085,879 | Trunp | July 6, 1937 |
| 1,965,550 | Kniesche | July 3, 1934 |
| 2,187,190 | Wilcox | Jan. 16, 1940 |
| 2,177,990 | Madden | Oct. 31, 1939 |
| 1,956,218 | Huntley | Apr. 24, 1934 |
| 2,173,122 | Mancuso | Sept. 19, 1939 |
| 1,141,267 | Ray et al. | June 1, 1915 |
| 842,320 | Landenberger | Jan. 29, 1907 |

FOREIGN PATENTS

| Number | Country | Date |
|---|---|---|
| 539,981 | Great Britain | Oct. 1, 1941 |